(12) United States Patent
Le et al.

(10) Patent No.: US 12,007,595 B2
(45) Date of Patent: Jun. 11, 2024

(54) OPTICAL SYSTEMS

(71) Applicant: 3M INNOVATIVE PROPERTIES COMPANY, St. Paul, MN (US)

(72) Inventors: John D. Le, Woodbury, MN (US); Gregg A. Ambur, San Clemente, CA (US); Zhisheng Yun, Sammamish, WA (US); Robert M. Jennings, Shoreview, MN (US); Arthur L. Kotz, Woodbury, MN (US); Timothy L. Wong, West St. Paul, MN (US); David T. Yust, Woodbury, MN (US); Timothy J. Nevitt, Red Wing, MN (US); Kayla A. McGrath, Cottage Grove, MN (US)

( * ) Notice: Subject to any disclaimer, the term of this patent is extended or adjusted under 35 U.S.C. 154(b) by 0 days.

(21) Appl. No.: 18/254,437

(22) PCT Filed: Nov. 16, 2021

(86) PCT No.: PCT/IB2021/060626
§ 371 (c)(1),
(2) Date: May 25, 2023

(87) PCT Pub. No.: WO2022/130056
PCT Pub. Date: Jun. 23, 2022

(65) Prior Publication Data
US 2024/0004117 A1  Jan. 4, 2024

Related U.S. Application Data

(60) Provisional application No. 63/125,082, filed on Dec. 14, 2020.

(51) Int. Cl.
*G02B 5/30* (2006.01)
*G02B 1/04* (2006.01)

(52) U.S. Cl.
CPC .............. *G02B 5/305* (2013.01); *G02B 1/041* (2013.01)

(58) Field of Classification Search
CPC ........ G02B 5/305; G02B 5/30; G02B 5/3025; G02B 5/3033; G02B 5/3041;
(Continued)

(56) References Cited

U.S. PATENT DOCUMENTS 5,882,774 A    3/1999   Jonza et al.
6,179,948 B1   1/2001   Merrill et al.
(Continued)

OTHER PUBLICATIONS

Chou, "Overview and applicability of residual stress estimation of film-substrate structure", Thin Solid Films, Sep. 2011, vol. 519, No. 22, pp. 7883-7894.
(Continued)

*Primary Examiner* — Stephone B Allen
*Assistant Examiner* — Adam W Booher
(74) *Attorney, Agent, or Firm* — Clifton F. Richardson

(57) ABSTRACT

An optical assembly includes an integral lens assembly having one or more lenses bonded to each other with spaced apart major first and second lens surfaces. First and second optical films are bonded to respective major first and second lens surfaces. The first and second optical films includes a plurality of polymeric layers. Each of the polymeric layers have an average thickness of less than about 500 nm. For a substantially normally incident light and a visible wavelength range the plurality of polymeric layers in the first optical film has an average optical transmittance and an average optical reflectance of greater than about 70% for a first polarization state and an orthogonal second polarization state, respectively. The plurality of polymeric layers in the
(Continued)

second optical film has an average optical transmittance of greater than about 70% for at least one of the first and second polarization states.

10 Claims, 5 Drawing Sheets

(58) Field of Classification Search
CPC .......... G02B 5/3083; G02B 1/10; G02B 1/11; G02B 1/111; G02B 1/14; G02B 1/04; G02B 1/08; G02B 1/041
See application file for complete search history.

(56) References Cited

U.S. PATENT DOCUMENTS

| | | |
|---|---|---|
| 6,480,338 B1 | 11/2002 | Ohzawa |
| 6,783,349 B2 | 8/2004 | Neavin et al. |
| 6,967,778 B1 | 11/2005 | Wheatley et al. |
| 7,242,524 B2 | 7/2007 | Dike |
| 8,817,371 B1 | 8/2014 | Boothroyd et al. |
| 9,162,406 B2 | 10/2015 | Neavin et al. |
| 9,555,589 B1 | 1/2017 | Ambur et al. |
| 2004/0014504 A1 | 1/2004 | Coates et al. |
| 2009/0202706 A1* | 8/2009 | Kousaka .......... B29D 11/00865 427/164 |
| 2012/0062846 A1 | 3/2012 | Dike |
| 2017/0017077 A1 | 1/2017 | Tang et al. |
| 2017/0102489 A1 | 4/2017 | Brown et al. |
| 2019/0179550 A1 | 6/2019 | Hart et al. |
| 2020/0096780 A1 | 3/2020 | Ouderkirk et al. |
| 2020/0319388 A1 | 10/2020 | Ambur et al. |

OTHER PUBLICATIONS

International Search Report for PCT International Application No. PCT/IB2021/060626, dated Feb. 24, 2022, 3 pages.

* cited by examiner

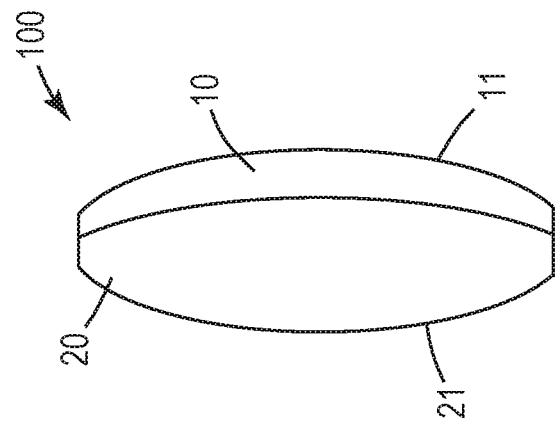
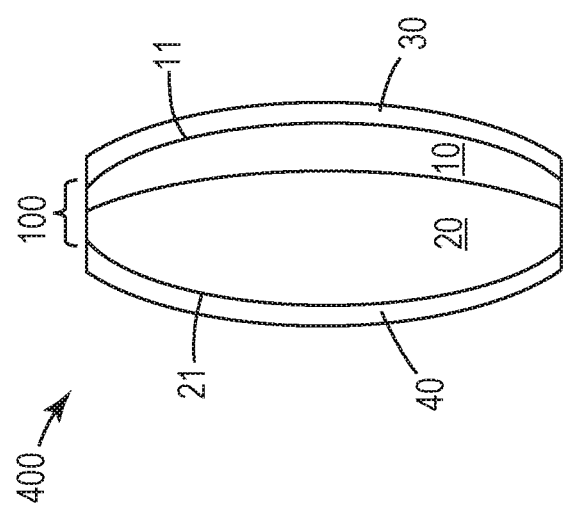

OPTICAL SYSTEMS

CROSS REFERENCE TO RELATED APPLICATIONS

This application is a national stage filing under 35 U.S.C. 371 of PCT/IB2021/060626, filed Nov. 16, 2021, which claims the benefit of U.S. Application No. 63/125,082, filed Dec. 14, 2020, the disclosures of which are incorporated by reference in their entirety herein.

TECHNICAL FIELD

The disclosure generally relates to the field of optics and, more particularly, to an optical system for forming an image.

BACKGROUND

Optical systems capable of forming images from illuminated objects find numerous and important applications in areas such as advertising, marketing and product exhibitions. Optical systems may also be included in head-mounted displays to provide images to a viewer. The optical system may include a display panel and various optical components between the display panel and an eye of the viewer. It is advantageous for such systems to be compact in size, have a wide field of view and high contrast and be viewable in all ambient lighting conditions.

SUMMARY

Some aspects of the disclosure relate to an optical assembly including an integral lens assembly having one or more lenses bonded to each other with spaced apart major first and second lens surfaces. First and second optical films are bonded to the respective major first and second lens surfaces. Each of the first and second optical films include a plurality of polymeric layers numbering at least 10 in total, each of the polymeric layers having an average thickness of less than about 500 nm. For a substantially normally incident light and a visible wavelength range extending from about 420 nm to about 680 nm, the plurality of polymeric layers in the first optical film has an average optical transmittance of greater than about 70% for a first polarization state and an average optical reflectance of greater than about 70% for an orthogonal second polarization state in the visible wavelength range. The plurality of polymeric layers in the second optical film has an average optical transmittance of greater than about 70% for at least one of the first and second polarization states in the visible wavelength range.

Some other aspects of the disclosure relate to an optical assembly including a polymeric optical lens having opposing major first and second lens surfaces, where at least one of the first and second lens surfaces is curved. First and second polymeric optical films are bonded to the respective major first and second lens surfaces. The first and second polymeric optical films have respective average thicknesses T1 and T2, respective elastic stiffnesses Q1 and Q2 in a same first direction, and respective thermal strains E1 and E2 in a same second direction, wherein products Q1T1E1 and Q2T2E2 are within 20% of each other.

Some other aspects of the disclosure relate to an optical assembly including a polymeric optical lens having opposing major first and second lens surfaces, where at least one of the first and second lens surfaces is curved. First and second polymeric optical films are bonded to the respective major first and second lens surfaces. The first and second polymeric optical films have respective average thicknesses T1 and T2, respective elastic stiffnesses Q1 and Q2 in a same first direction, and respective coefficients of thermal expansion A1 and A2 in a same second direction, wherein products Q1T1A1 and Q2T2A2 are within 20% of each other.

Some other aspects of the disclosure relate to an optical assembly including an integral lens assembly having one or more lenses bonded to each other with spaced apart major first and second lens surfaces. A polymeric reflective polarizer is bonded to the major first lens surface and an optical film is bonded to the major second lens surface. The optical film includes a first optical layer having indices of refraction nx1 and ny1 along mutually orthogonal in-plane respective x- and y-directions and an index of refraction nz1 along a thickness direction of the optical layer orthogonal to the x- and y-directions. For at least one wavelength in a visible wavelength range extending from about 420 nm to about 650 nm, a magnitude of a difference between nx1 and ny1 is greater than about 0.02, and a magnitude of a difference between nz1 and one of nx1 and ny1 is less than about 0.02. For a substantially normally incident light and the visible wavelength range the reflective polarizer has an average optical transmittance of greater than about 70% for the incident light polarized along one of the x- and y-directions, and an average optical reflectance of greater than about 70% for the incident light polarized along the other one of the x- and y-directions. The polymeric reflective polarizer exhibits transmission variation depending on azimuthal orientation with the maximum reflection corresponding to one orientation defining the principal optical axis. This may alternatively be called block state. At perpendicular orientation to the block state, the transmission would reach a maximum and this is commonly referred to as a pass state for the polarizer. These pass and block states define the principal optical axes for the reflective polarizer. The first optical layer of the optical film has an average optical transmittance of greater than about 70% for the incident light polarized along each of the x- and y-directions.

Some other aspects of the disclosure relate to an optical assembly including an integral lens assembly having one or more lenses bonded to each other with spaced apart major first and second lens surfaces. A polymeric reflective polarizer is bonded to the major first lens surface and an optical film is bonded to the major second lens surface. The optical film includes a first optical layer having indices of refraction nx1 and ny1 along mutually orthogonal in-plane respective x- and y-directions and an index of refraction nz1 along a thickness direction of the optical layer orthogonal to the x- and y-directions. For at least one wavelength in a visible wavelength range extending from about 420 nm to about 650 nm, nx1>ny1>nz1, and each of nx1−ny1 and ny1−nz1 is greater than about 0.02. For a substantially normally incident light and the visible wavelength range the reflective polarizer has an average optical transmittance of greater than about 70% for the incident light polarized along one of the x- and y-directions, and an average optical reflectance of greater than about 70% for the incident light polarized along the other one of the x- and y-directions. The first optical layer of the optical film has an average optical transmittance of greater than about 70% for the incident light polarized along each of the x- and y-directions.

Some other aspects of the disclosure relate to an optical assembly including a polymeric optical lens having opposing major first and second lens surfaces where at least one of the first and second lens surfaces is curved. First and second polymeric optical films are bonded to the respective major first and second lens surfaces. Each of the first and second polymeric optical films has an average thickness T, an elastic stiffness Q along a same first direction, and a thermal strain E along the first direction, wherein a product QTE for the first polymeric optical film is within 20% of a product QTE for the second polymeric optical film.

In some cases, the thermal strains may be dominated by reversible thermal expansion behaviour. In these cases, the thermal strains can be sufficiently defined as the product of thermal expansion coefficients, A1 and A2, defined in the same second direction, and a change in temperature. In other aspects, the thermal strains may be dominated by non-reversible, or shrinkage behaviour. In other aspects, the thermal strains may result from a combination of both reversible thermal expansion and non-reversible effects.

Some other aspects of the disclosure relate to an optical assembly including a polymeric optical lens having opposing major first and second lens surfaces, where at least one of the first and second lens surfaces curved. First and second polymeric optical films are bonded to the respective major first and second lens surfaces. Each of the first and second polymeric optical films has an average thickness T, an elastic stiffness Q along a same first direction, and a coefficient thermal expansion A along the first direction, wherein a product QTA for the first polymeric optical film is within 20% of a product QTA for the second polymeric optical film.

Other embodiments of the disclosure relate to an optical system for displaying an image to a viewer including a display adapted to emit an image and an optical assembly according to one or more of the embodiments described in the disclosure. A first retarder layer is disposed between the optical assembly and the display. A display lens is disposed between the first retarder layer and the display. A partial reflector is disposed on and conforms to a major surface of the first optical lens and has an average optical reflectance of at least 30% in the visible wavelength range.

BRIEF DESCRIPTION OF DRAWINGS

The various aspects of the disclosure will be discussed in greater detail with reference to the accompanying figures where, FIG. 1A schematically shows an optical assembly according to some embodiments;

FIG. 1B schematically shows an integral lens assembly according to some embodiments;

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

Insert mold lens with optical film without considering the balance of mechanical system, in particularly relating to thermal expansion mismatches in layered composites, may result in change in optical form which may no longer meet the optical specification of the lens. If in-plane mechanical properties are not balanced, changes in curvature with temperature or time may occur. Mechanically imbalanced composite polymeric optical lens including optical functional film (uniaxial/biaxial stretched optical film, which material is similar or dissimilar to polymer resin) on lens surface/surfaces may not be able to maintain form accuracy and may fail reliability testing. In layered composites mechanical balancing is achieved by ensuring that there is a symmetric distribution of material properties from a center 'plane'.

While it may be possible to reduce bending effects by making one layer thicker than the other it may not eliminate the effect. The initial curvature may be changed such that the structure warps into the desired shape at the end of the process, but the desired shape may only occur at one temperature and may be susceptible to changing over time due to creep. It may be advantageous to balance both the elastic (reversible) properties as well as the residual stresses within the construction. Also, while balancing mechanical properties in one direction can be employed to mitigate bending in that direction, in practice, this balancing must generally be performed simultaneously along in two separate orthogonal axes, preferably aligning with the axes of maximum and minimum values of stress generation within the films, also herein called the principal directions of stress generation.

Embodiments disclosed herein provide a solution to create insert molded optical lens with reliable form. Other embodiments disclosed herein describe composite optical lens with balanced uniaxial/biaxial stretched optical film on lens surface/surfaces to maintain and improve form accuracy.

Figure 4:
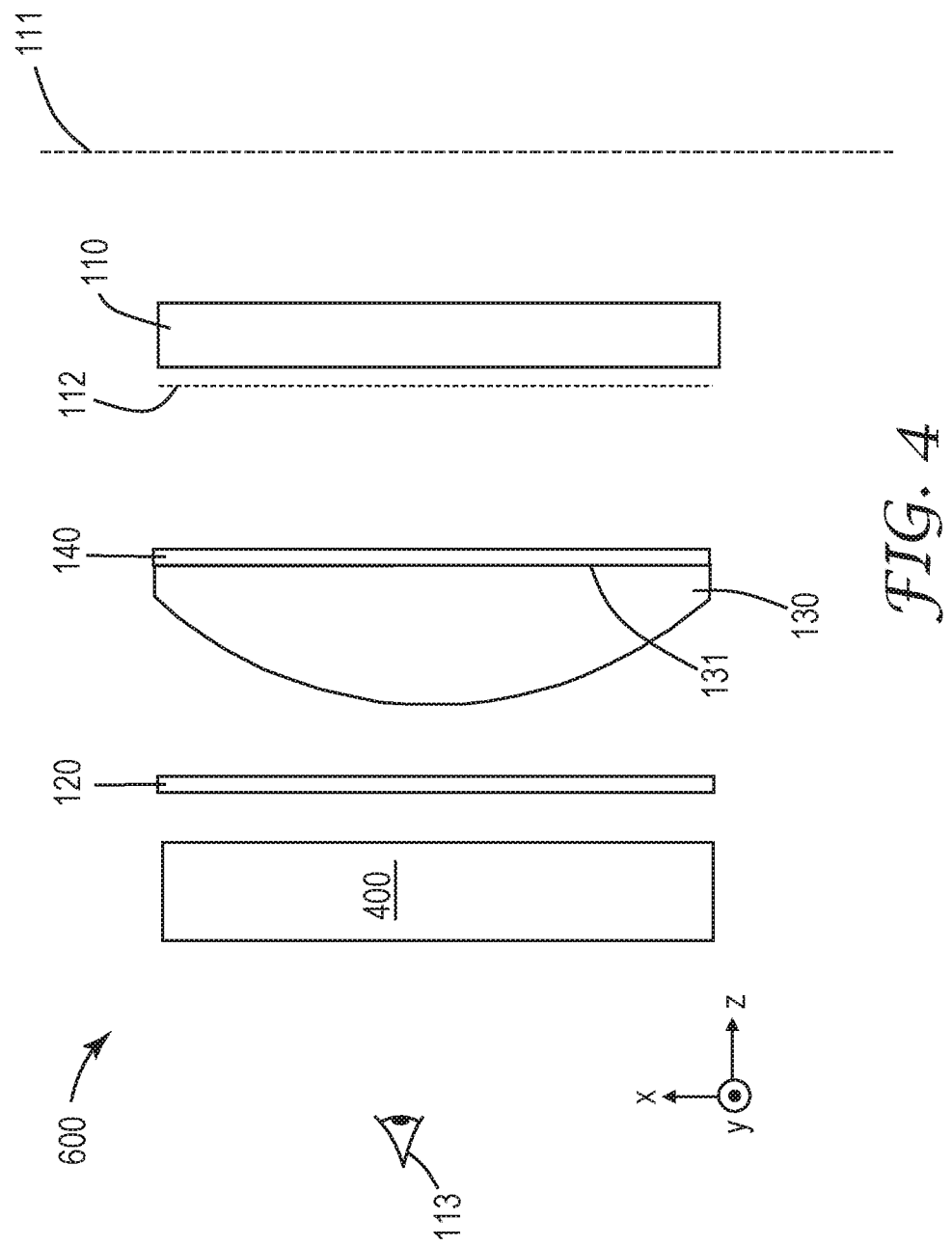
FIG. 4 schematically shows an optical system for displaying an image to a viewer according to some embodiments.

An optical system (600) for displaying an image (111) to a viewer (113) is schematically illustrated in FIG. 4. The optical system includes an optical assembly (400) and a display (110) adapted to emit an image (112). A first retarder layer (120) may be disposed between the optical assembly (400) and the display (110) and a display lens (130) may be disposed between the first retarder layer (120) and the display (110). A partial reflector (140) may be disposed on the display lens (130) and, in some embodiments, made to conform to a major surface (131) of the display lens (130). The partial reflector (140) may have an average optical reflectance of at least 30% in the visible wavelength range.

FIGS. 1A and 1B schematically show an optical assembly (400) including an integral lens assembly (100). In some embodiments, the integral lens assembly may include a single lens (10, 20). In other embodiments the lens assembly (100) may include one or more lenses (10, 20) bonded to each other having spaced apart major first (11) and second (21) lens surfaces as best seen in FIG. 1B. A first optical film (30) may be bonded to the major first lens surface (11), and a second optical film (40) may be bonded to the major second lens surface (21).

Figure 3C:
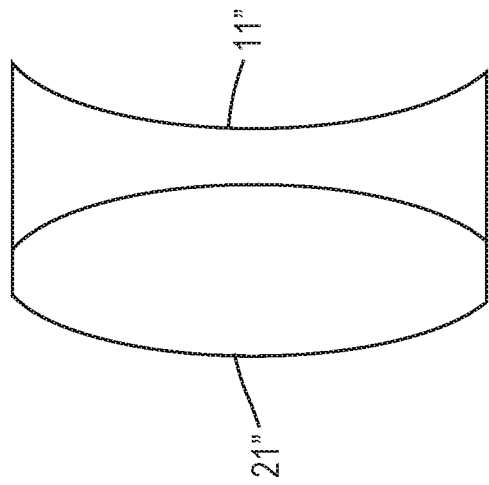
FIGS. 3A-3C schematically show lens assemblies with one or more lenses having concave and/or convex lens surfaces according to different embodiments.
Figure 3B:
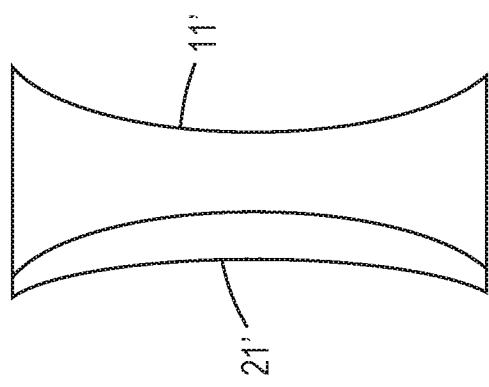
Figure 3A:
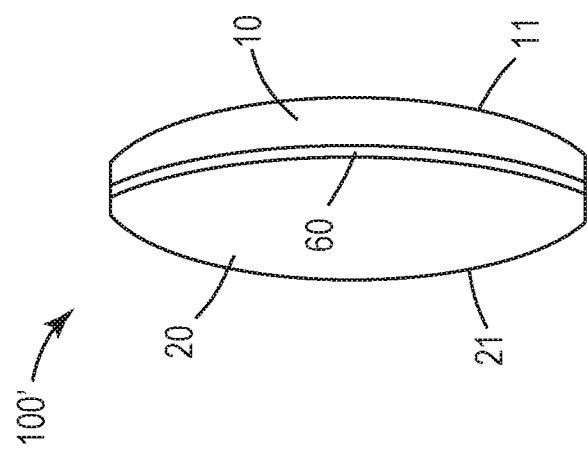

In some aspects, as shown in FIG. 3A, the one or more lenses (10, 20) of the integral lens assembly (100') may be bonded to each other via an adhesive layer (60). As depicted in FIGS. 3A-3C, both the major first (11) and second (21)

lens surfaces of the lenses (10, 20) may be convex, or, both the major first (11') and second (21') lens surfaces may be concave. In other embodiments, one (11") of the major first and second lens surfaces may be concave and the other (21") of the major first and second lens surfaces may be convex.

Figure 2:
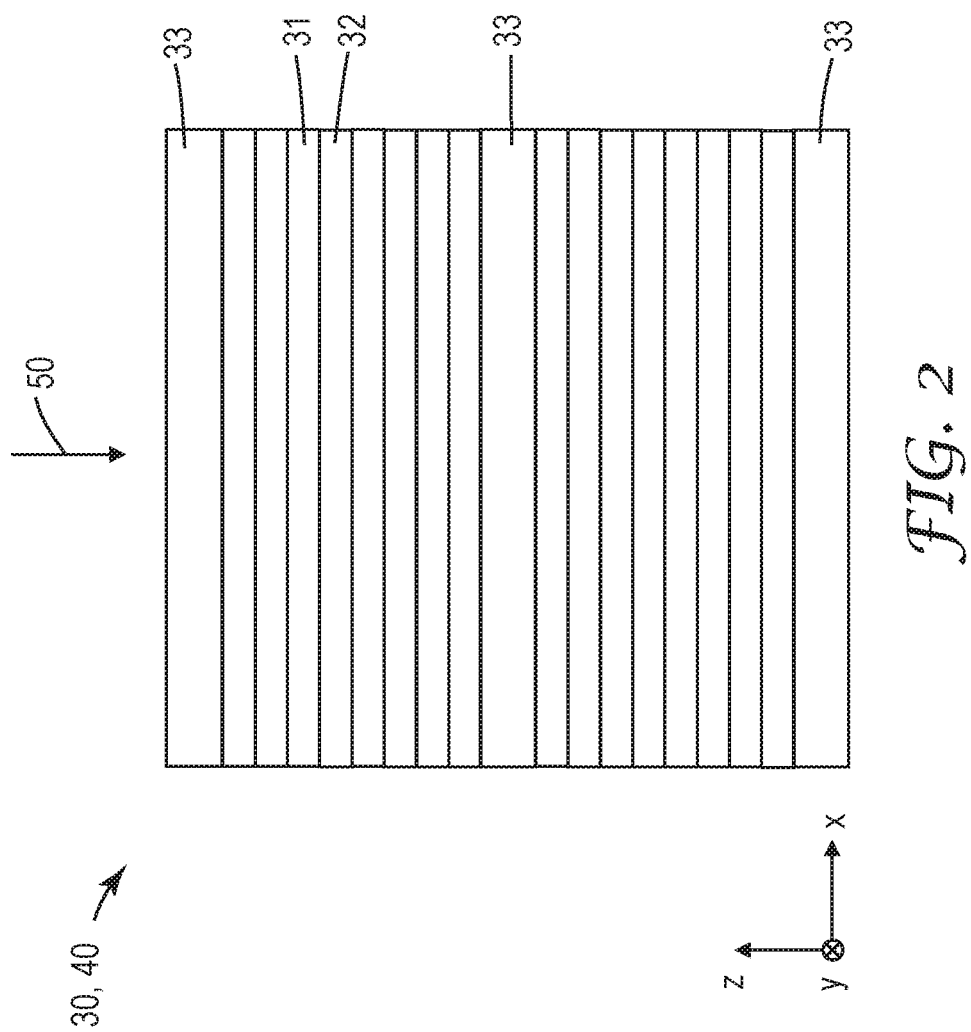
FIG. 2 schematically shows the construction of an optical film according to some embodiments.

In some aspects, each of the first and second optical films (30, 40) may be a multilayer optical film (MOF) including a plurality of polymeric layers (31, 32) as shown in FIG. 2. In some instances, the plurality of polymeric layers (31, 32) may number at least 10 in total. In some instances, the plurality of polymeric layers (31, 32) may number at least 50, or at least 100, or at least 200, or at least 300, or at least 400, or at least 500 in total. Each of the polymeric layers (31, 32) may have an average thickness of less than about 500 nm, or less than about 400 nm, or less than about 200 nm. In some embodiments, the number of layers in the optical film (30) may be selected to achieve the desired optical properties using the minimum number of layers for reasons of film thickness, flexibility and economy. For instance, at least one of the first and second optical films (30, 40) may include fewer than 10 polymeric layers. At least one of the first and second optical films (30, 40) may include at least one skin layer (33). The average thickness of the at least one skin layer (33) may be greater than about 500 nm, or, in some instances, greater than 700 nm, or greater than 1 micron. For the first and second optical films including a plurality of polymeric layers as described herein, principal directions are selected such that x and y axes are in-plane of the layers and the z axis corresponds to the thickness of layers. The principal axes of elasticity for the films are the directions in which the modulus, thermal expansion and refractive index will achieve their extreme (maximum or minimum) values. These should also align with the pass and blocking optical directions within the films. When the thermal strains are dominated by reversible thermal expansion behavior, the principal directions of stress generation will align with the principal directions of elasticity for film. However, when non-reversible effects such as shrinkage dominate the thermal strains, the principal directions of stress generation can differ significantly from the principal directions of elasticity.

Multilayer polymeric films may exhibit a wide range of optical and physical properties, and may be utilized in a variety of optical and non-optical applications. The optical and physical properties of a multilayer film may depend on a number of variables, including the type of polymeric materials used for the individual layers, the overall number of individual layers of a film, and/or the layer thickness profile of a film. As a result, the properties of a multilayer film may be tailored by precisely controlling one or more of these variables during the film manufacturing process. A multilayer polymeric film may include a plurality of individual layers each formed of one or more types of polymeric materials. For example, certain multilayer optical films may include hundreds of individual polymeric layers alternating between high and low index polymeric materials. The formation of such polymeric layers may be accomplished via a feedblock apparatus that receives suitable polymeric materials, generally in the form of polymeric melt streams, and orients the polymeric materials into a multilayer polymeric flow stream including a stack of individual layers. After exiting a feedblock, the multilayer flow stream may then be further processed within a film line to generate a multilayer optical film. Examples of feedblocks and film lines configured to manufacture multilayer optical films are described, for example, in U.S. Pat. No. 6,783,349 to Neavin et al, for example.

Various MOFs are generally known. MOFs generally include alternating first (31) and second (32) polymeric layers including at least one birefringent polymer (e.g. oriented semi-crystalline polymer) and one second polymer. In some aspects, the optical film (30) may be a multilayer stack having alternating first and second optical layers (31, 32) of at least two materials. In one embodiment, the materials of first and second layers (31) and (32) may be composed of polymers such as polyesters. For instance, an exemplary polymer useful as a first birefringent layer (31) in the multilayer optical film (30) may be polyethylene naphthalate (PEN). Other semicrystalline polyesters suitable as birefringent polymers as the first birefringent layer (31) in the multilayer optical film (30) may include, for example, polybutylene 2,6-naphthalate (PBN), polyethylene terephthalate (PET), or the like. The second layer (32) of the multilayer optical film (30) can be made from a variety of polymers having glass transition temperatures compatible with that of the first birefringent polymer layer (31) and having a refractive index similar to the isotropic refractive index of the first birefringent polymer layer (31). Examples of other polymers suitable for use in optical films and, particularly, in the second polymer layer (32) may include vinyl polymers and copolymers made from monomers such as vinyl naphthalenes, styrene, maleic anhydride, acrylates, and methacrylates. Examples of such polymers include polyacrylates, polymethacrylates, such as poly (methyl methacrylate) (PMMA), and isotactic or syndiotactic polystyrene. Other polymers include condensation polymers such as polysulfones, polyamides, polyurethanes, polyamic acids, and polyimides. In addition, the second polymer layer (32) can be formed from homopolymers and copolymers of polyesters, polycarbonates, fluoropolymers, and polydimethylsiloxanes, and blends thereof. The layers are selected to achieve the reflection of a specific bandwidth of electromagnetic radiation. In one embodiment, the materials of the plurality of layers (31, 32) may have differing indices of refraction. In some embodiments the one of the first and second optical films (30, 40) may include PET as the first optical layer (31) and co polymers of PMMA (coPMMA), or any other polymer having low refractive index, including copolyesters, fluorinated polymers or combinations thereof as the second optical layer (32). The transmission and reflection characteristics of the optical films (30, 40) is based on coherent interference of light caused by the refractive index difference between the layers (31, 32) and the thicknesses of layers (31, 32).

In some embodiments, for a substantially normally incident light (50) and a visible wavelength range extending from about 420 nm to about 680 nm, the plurality of polymeric layers (31, 32) in the first optical film (30) may have an average optical transmittance of greater than about 70% for a first polarization state (x-axis) and an average optical reflectance of greater than about 70% for an orthogonal second polarization state (y-axis) in the visible wavelength range. In some instances, the average optical transmittance of the first optical film (30) may be greater than about 80%, or greater than about 85%, or greater than about 90%, or greater than about 95%, or greater than about 99% for the first polarization state (x-axis) and the optical reflectance of the first optical film (30) may be greater than about 80% or greater than about 85%, or greater than about 90%, or greater than about 95%, or greater than about 99% for the orthogonal second polarization state (y-axis) in the visible wavelength range. The plurality of polymeric layers in the second optical film (40) may have an average optical transmittance of greater than about 70%, or, in some instances, greater than about 80%, or greater than about 85%, or greater than about 90%, or greater than about 95%, or greater than about 99% for at least one of, or for each of, the first and second polarization states in the visible wavelength range.

In some embodiments, in the ultraviolet wavelength range, say, for at least one wavelength less than about 400 nm, the plurality of polymeric layers (31, 32) in the second optical film (40) may have an average optical transmittance of greater than about 60%, or greater than about 70%, or greater than about 80% for the first polarization state (x-axis) and an average optical reflectance of greater than about 60%, or greater than about 70%, or greater than about 80% for the second polarization state (y-axis).

According to some embodiments, in the infrared wavelength range, say, for at least one wavelength greater than about 750 nm, the plurality of polymeric layers (31, 32) in the second optical film (40) may have an average optical transmittance of greater than about 60% or greater than about 70%, or greater than about 80% for the first polarization state (x-axis) and an average optical reflectance of greater than about 60% or greater than about 70%, or greater than about 80% for the second polarization state (y-axis).

In another embodiment, for at least one wavelength greater than about 750 nm in the infrared wavelength range, the second optical film (40) may be made to be substantially transparent. For example, the plurality of polymeric layers in the second optical film (40) may have an average optical transmittance of greater than about 60% or greater than about 70%, or greater than about 80% for each of the first (x-axis) and second (y-axis) polarization states.

In another embodiment, for at least one wavelength greater than about 750 nm in the infrared wavelength range, the second optical film (40) may be made to be substantially reflective. For example, the plurality of polymeric layers in the second optical film (40) may have an average optical reflectance of greater than about 60% or greater than about 70%, or greater than about 80% for each of the first (x-axis) and second (y-axis) polarization states.

In another embodiment, in the visible wavelength range extending from about 420 nm to about 680 nm, at least one of the first (30) and second (40) optical films may be made to be substantially non-absorptive. For example, for at least one of the first (x-axis) and second (y-axis) polarization states, the plurality of polymeric layers of at least one of the first (30) and second (40) optical films may have an average optical absorption of less than about 20%, or less than about 15%, or less than about 10%, or less than about 5% in the visible wavelength range.

Figure 5:
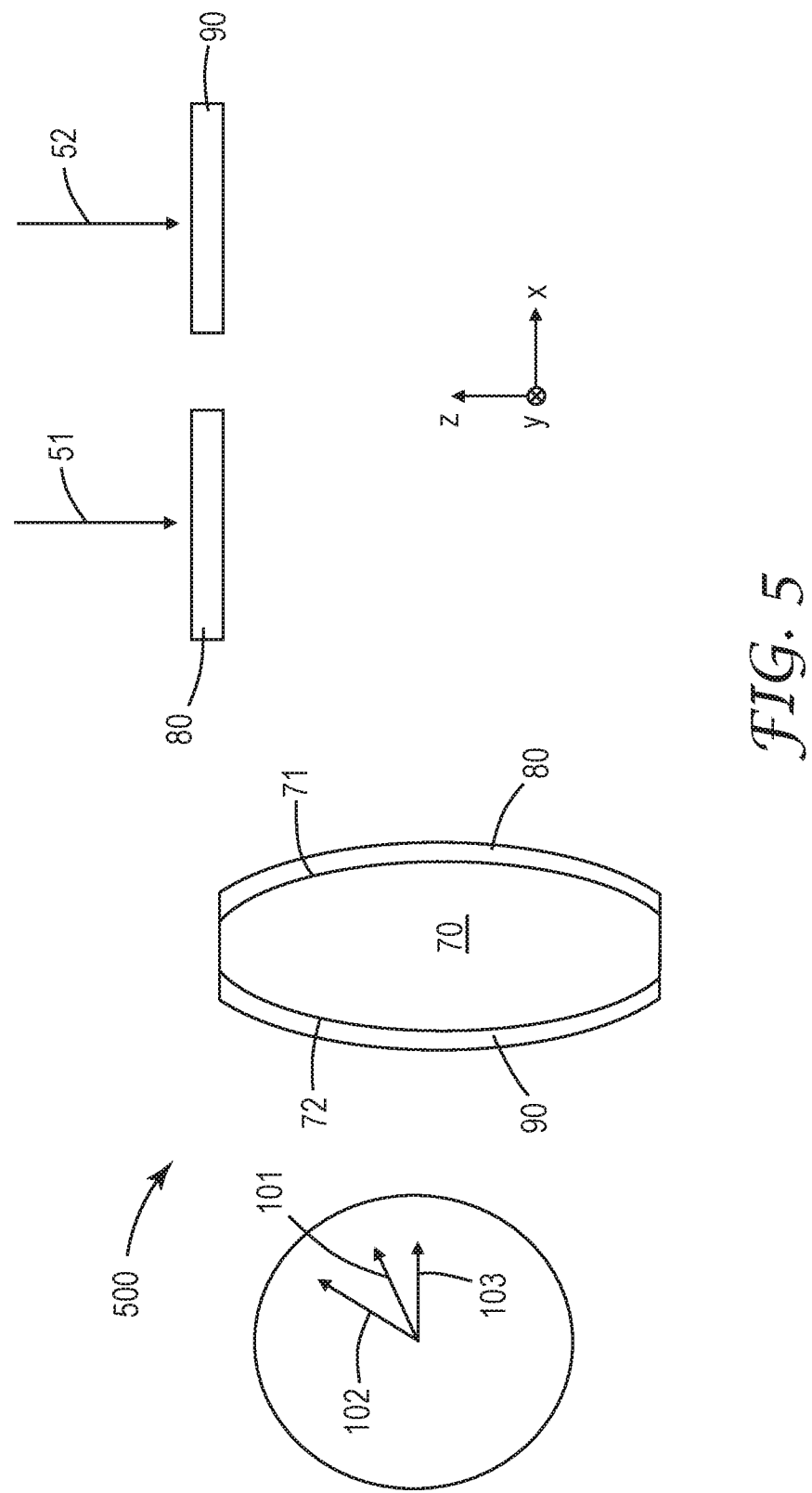
FIG. 5 schematically shows an optical assembly with polymeric optical lens according to some embodiments.

In other embodiments, the optical assembly may include multiple layers of orthotropic materials that may undergo small degrees of bending due to either external or internal (e.g. thermal mismatch) loadings. Each layer may have an average thickness, a set of orthotropic elastic stiffness properties, and a set of orthotropic thermal strains. For instance, as best seen in FIG. 5, an optical assembly (500) with multiple layers may include a polymeric optical lens (70) having a major first lens surface (71) and an opposing major second lens surface (72), a first polymeric optical film (80) bonded to the major first lens surface (71) and a second polymeric optical film (90) bonded to the major second lens surface (72). At least one of the first and second lens surfaces (71, 72) may be curved. Each of the first and second polymeric optical films (80, 90), may have an average thickness T, an elastic stiffness Q along a same first direction (101), and a thermal strain E along the first direction. In some aspects, a product QTE for the first polymeric optical film (80) may be within 20% or 15%, or 10%, or 5%, or 2%, or 1% of a product QTE for the second polymeric optical film (90). When the thickness of the polymeric optical lens (70) is larger than the average thicknesses of the first and second polymeric optical films (80, 90), the thermal strains along a neutral plane, being a plane located half-way through the entire thickness of the optical assembly, may be dominated by the lens material. In some instances, in order to prevent thermal bending of the optical lens, both the layer stiffnesses of the first and second polymeric optical films (80, 90), and the product of the layer stiffnesses with the thermal strains of the first and second polymeric optical films (80, 90), may be balanced out.

In other embodiments, the first polymeric optical film (80) bonded to the major first lens surface (71) may have an average thickness T1, and the second polymeric optical film (90) bonded to the major second lens surface (72) may have an average thickness T2. At least one of the first and second lens surfaces (71, 72) may be curved. In some instances, the first polymeric optical film (80) may be a mechanical balancing film (MBF) and the second polymeric optical film (90) may be a reflecting polarizing film (RPF). Thickness profiles of the first and second polymeric optical films (80, 90) may be selectively obtained as generally described in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example. In some instances, at least one of the first and second polymeric optical films (80, 90) may include a plurality of polymeric layers totaling at least 10 in total. In other instances, at least one of the first and second polymeric optical films (80, 90) may include fewer than 10 polymeric layers.

For instance, as shown in FIG. 5, the first polymeric optical film (80) may have an elastic stiffness Q1 in a first direction (101) and the second polymeric optical film (90) may have an elastic stiffness Q2 in a same first direction (101). The first polymeric optical film (80) may have a thermal strain E1 in a second direction (102) and the second polymeric optical film (90) may have a thermal strain E2 in a same second direction (102). The first and second directions (101, 102) may be within 20 degrees of each other, or in some instances, within 15 degrees, or 10 degrees, or 5 degrees, or 2 degrees of each other.

In some embodiments, products Q1T1E1 and Q2T2E2 may be within 20% of each other. In some other embodiments, products Q1T1E1 and Q2T2E2 may be within 15%, or 10%, or 5%, or 2%, or 1% of each other. Balancing out the products of the elastic stiffnesses, thicknesses and thermal strains of the first and second polymeric optical films (80, 90) may prevent changes in lens curvature from occurring.

A change in lens curvature may also occur in the optical lens as a result of simple thermal expansion of the lens material. In some embodiments, each of the first and second polymeric optical films (80, 90) may have an average thickness T, an elastic stiffness Q along a same first direction (101), and a coefficient of thermal expansion A along the same first direction. A product QTA for the first polymeric optical film (80) may be within 20% of a product QTA for the second polymeric optical film (90). In some instances, a product QTA for the first polymeric optical film (80) may be within 15%, or within 10%, or within 5%, or within 2%, or within 1% of a product QTA for the second polymeric optical film (90).

In most cases, the principal axes for A will match the principal axes for Q within 5 degrees. In contrast, the principal axes for E can be completely independent from the principal axes for Q and A. In some cases, the differences in principal axes for A and Q and the principal axes for E can be greater than degrees. In other cases, the difference between the principal axes of A and Q and the principal axes for E can be greater than 30 degrees. In other cases, the difference between the principal axes of A and Q and the principal axes for E can be greater than 40 degrees. In such cases, the principal axes or directions of thermal stress development would be defined as the directions in which the product of the modulus, Q, and the thermal strain, E, achieve their extreme (maximum or minimum) values, as opposed to the principal directions of the individual properties. In such cases, the principal directions of thermal stress may not align with the pass and block optical directions within the films. Also, while balancing mechanical properties in one direction can be employed to mitigate bending in that direction, in practice, this balancing must generally be performed simultaneously along in two separate orthogonal axes, preferably aligning with the axes of maximum and minimum values of stress generation within the films.

In cases where the lens thickness is much larger than the film thicknesses and the lens curvatures are small, the design criteria discussed above can be applied quite rigorously, especially when film expansion is dominated by reversible behavior. However, for thinner lenses and/or cases of high lens curvature, the mechanics governing both the magnitudes and directions of the mechanical balancing can become more complicated and require some corrections. For instance, for thinner lenses, it may be necessary to account for the elasticity and bending rigidity of the lens as well. The mathematical equations covering the exact balance become more complex, but have been well studied in the composites industries over time and are well described in composites textbooks such as Vinson and Sierakowski (*The Behavior of Structures Composed of Composite Materials*, Martinus Nijhoff Publishers, Dordrecht, 1987) and others. High lens curvatures can complicate these relations even further. However, while the mathematical equations describing the exact balancing may become more complex, for many of the cases of interest within this application, the results of the exact calculation still fall within the earlier stated condition of the products of Q, T and E and/or Q, T and A for each film and within the same direction, being within 20% of each other.

Also, in cases where one of the lens faces has a very high curvature relative to the other side, the forming of an orthotropic film to the curved surface may cause principal directions of that film, and even the projections of those principal directions onto the low curvature (or flat) side to vary with position and with respect to a substantially uniform film on the low curvature side. In such cases it may only be possible to achieve perfect balance at a single point or along a pair of lateral axes. In such cases, balancing becomes an optimization problem where the choices of regions of best balancing are determined by whichever results in the smallest amount of deviation from the desired lens shape. However, for many of the cases of interest within this application, the differences in directions between principal directions for the two films at any point projected on to the low curvature face remain within 20° of each other.

In some embodiments, the first and second polymeric optical films (80, 90) may have respective coefficients of thermal expansion A1 and A2 in a same third direction (103) as shown in FIG. 5. In some instances, balancing out the products of the elastic stiffnesses, thicknesses and thermal expansion of the first and second polymeric optical films (80, 90) may prevent changes in lens curvature from occurring. For instance, in some aspects, the products Q1T1A1 and Q2T2A2 may be within 20% of each other. In other instances, the products Q1T1A1 and Q2T2A2 may be within 15%, or 10%, or 5%, or 2%, or 1% of each other. The first (101) and third (103) directions may be within 20 degrees of each other, or in some instances, within 15 degrees, or 10 degrees, or 5 degrees, or 2 degrees of each other.

In some other embodiments, for a same second direction (102) orthogonal to the first direction, each of the first and second polymeric optical films (80, 90) may have an average thickness T, an elastic stiffness Q' and a thermal strain E'. A product Q'TE' for the first polymeric optical film (80) may be within 20% of a product Q'TE' for the second polymeric optical film (90). In some instances, product Q'TE' for the first polymeric optical film (80) may be within 15%, or within 10%, or within 5%, or within 2%, or within 1% of a product Q'TE' for the second polymeric optical film (90). In other aspects, along the second direction (102), each of the first (80) and second (90) polymeric optical films may have a coefficient of thermal expansion A'. A product Q'TA' for the first polymeric optical film (80) may be within 20%, or within 15%, or within 10%, or within 5%, or within 2%, or within 1% of a product Q'TA' for the second polymeric optical film (90).

In some aspects, the first direction may be substantially an in-plane direction of each of the first and second polymeric optical films (80, 90). The second direction may be substantially an in-plane direction of each of the first and second polymeric optical films (80, 90). For the first and second polymeric optical films including a plurality of polymeric layers as described herein, the principal directions are selected such that x and y axes are in-plane of the layers and the z axis corresponds to the thickness or height of the layers. In some aspects, the first and second directions may be chosen to be within 10 degrees, or within 5 degrees of the principal in-plane directions (x, y) in the film.

In some aspects, for a substantially normally incident light (51, 52), each of the first and second polymeric optical films (80, 90) may have an average optical transmittance of greater than about 70%, or greater than 80%, or greater than 90% for at least a first polarization state (x-axis) in a visible wavelength range extending from about 420 nm to about 650 nm. For the substantially normally incident light (51, 52), at least one of the first and second polymeric optical films (80, 90) may have an average optical transmittance of greater than about 70%, or greater than 80%, or greater than 90% for a second polarization state (y-axis), orthogonal to the first polarization state, in the visible wavelength range extending from about 420 nm to 650 nm.

Referring back to FIGS. 1A and 1B, in some embodiments, the first optical film (30) may be a polymeric reflective polarizer (30) bonded to the major first lens surface (11) and the second optical film (40) may be a uniaxially oriented optical film (40) bonded to the major second lens surface (21). In some aspects, the optical film may include a birefringent material. The term "birefringent" means that the indices of refraction in orthogonal x, y, and z directions are not all the same. For the optical film described herein, the principal directions may be selected so that x and y axes are in the plane of the film and the z axis corresponds to the thickness or height of the film. The principal directions of the films are the directions in which the modulus, thermal expansion and refractive index will achieve their extreme (maximum or minimum) values. These should also align with the pass and blocking optical directions within the reflective polarizer films.

In some instances, the optical film (40) may include a first optical layer having indices of refraction nx1 and ny1 along mutually orthogonal in-plane respective x- and y-directions and an index of refraction nz1 along a thickness direction of the optical layer orthogonal to the x- and y-directions. For at least one wavelength in a visible wavelength range extending from about 420 nm to about 650 nm, the in-plane birefringence, being a magnitude of a difference between the maximum and minimum in-plane indices of refraction nx1 and ny1 of the first optical layer, may be greater than about 0.02. In some instances, the magnitude of a difference between nx1 and ny1 may be greater than about 0.05, or greater than about 0.10, or greater than about 0.15, or greater than about 0.20, or greater than about 0.22. The out-of-plane birefringence, being a magnitude of a difference between one of the in-plane indices of refraction (e.g., nx1 or ny1) and an out-of-plane index of refraction nz1 of the first optical layer, may be less than about 0.02, In some instances, the magnitude of a difference between nz1 and one of nx1 and ny1 may be less than about 0.015, or less than about 0.01, or less than about 0.007, or less than about 0.005. The optical film (40) may also include a second optical layer, which may be an isotropic layer. The second optical layer includes indices of refraction nx2, ny2 and nz2 along the respective x-, y- and z-directions. In some instances, for the at least one wavelength in the visible wavelength range extending from about 420 nm to about 650 nm, the in-plane birefringence, being a magnitude of a maximum difference between indices of refraction nx2, ny2 and nz2 of the second optical layer, may be less than about 0.02. In some instances, the out-of-plane birefringence, being the magnitude of a difference between indices of refraction nx2, ny2 and nz2 of the second optical layer may be less than about 0.015, or less than about 0.01, or less than about 0.007, or less than about 0.005.

In some other embodiments, for at least one wavelength in a visible wavelength range extending from about 420 nm to about 650 nm, nx1>ny1>nz1. In other embodiments, the magnitude of a difference between each of nx1−ny1 and ny1−nz1 may be greater than about 0.02. In some instances, the magnitude of each of nx1−ny1 and ny1−nz1 may be greater than about 0.03, or greater than about 0.04, or greater than about 0.05.

For a substantially normally incident light and the visible wavelength range, the reflective polarizer (30) may have an average optical transmittance of greater than about 70% for the incident light polarized along one of the x- and y-directions. In some instances, the average optical transmittance may be greater than about 80%, or greater than about 90% for the incident light polarized along one of the x- and y-directions. An average optical reflectance of the reflective polarizer (30) for a substantially normally incident light and the visible wavelength range may be greater than about 70% for the incident light polarized along the other one of the x- and y-directions. In some instances, the average optical reflectance may be greater than about 80%, or greater than about 90% for the incident light polarized along the other one of the x- and y-directions. The first optical layer of the optical film (40) may have an average optical transmittance of greater than about 70% for the incident light polarized along each of the x- and y-directions. In some instances, the average optical transmittance may be greater than about 80%, or greater than about 90% for the incident light polarized along each of the x- and y-directions.

The invention claimed is:

1. An optical assembly comprising:
   an integral lens assembly comprising one or more lenses bonded to each other and comprising spaced apart major first and second lens surfaces; and
   first and second optical films bonded to the respective major first and second lens surfaces, each of the first and second optical films comprising a plurality of polymeric layers numbering at least 10 in total, each of the polymeric layers having an average thickness of less than about 500 nm, such that for a substantially normally incident light and a visible wavelength range extending from about 420 nm to about 680 nm:
   the plurality of polymeric layers in the first optical film has an average optical transmittance of greater than about 70% for a first polarization state and an average optical reflectance of greater than about 70% for an orthogonal second polarization state in the visible wavelength range; and
   the plurality of polymeric layers in the second optical film has an average optical transmittance of greater than about 70% for at least one of the first and second polarization states in the visible wavelength range,
   wherein the first and second optical films have respective average thicknesses T1 and T2, respective elastic stiffnesses Q1 and Q2 in a same first direction, respective thermal strains E1 and E2 in a same second direction, and respective coefficients of thermal expansion A1 and A2 in a same third direction, the third direction being within 20 degrees of the first direction, wherein:
   products Q1×T1×E1 and Q2×T2×E2 are within 20% of each other, and/or
   products Q1×T1×A1 and Q2×T2×A2 are within 20% of each other.

2. The optical assembly of claim 1, wherein the plurality of polymeric layers in the second optical film has an average optical transmittance of greater than about 70% for each of the first and second polarization states in the visible wavelength range.

3. The optical assembly of claim 1, wherein for at least one wavelength less than about 400 nm, the plurality of polymeric layers in the second optical film has an average optical transmittance of greater than about 60% for the first polarization state and an average optical reflectance of greater than about 60% for the second polarization state, and wherein for at least one wavelength greater than about 750 nm, the plurality of polymeric layers in the second optical film has an average optical transmittance of greater than about 60% for the first polarization state and an average optical reflectance of greater than about 60% for the second polarization state.

4. The optical assembly of claim 1, wherein for at least one of the first and second polarization states, the plurality of polymeric layers of at least one of the first and second optical films has an average optical absorption of less than about 20% in the visible wavelength range.

5. An optical system for displaying an image to a viewer, comprising:
   a display adapted to emit an image;
   the optical assembly of claim 1;
   a first retarder layer disposed between the optical assembly and the display;
   a display lens disposed between the first retarder layer and the display; and
   a partial reflector disposed on and conforming to a major surface of the display lens and having an average optical reflectance of at least 30% in the visible wavelength range.

6. An optical assembly comprising:
- a polymeric optical lens comprising opposing major first and second lens surfaces, at least one of the first and second lens surfaces curved; and
- first and second polymeric optical films bonded to the respective major first and second lens surfaces, the first and second polymeric optical films having respective average thicknesses T1 and T2, respective elastic stiffnesses Q1 and Q2 in a same first direction, and respective thermal strains E1 and E2 in a same second direction, wherein the second polymeric optical film is a reflecting polarizing film and the first polymeric optical film is a mechanical balancing film such that products Q1×T1×E1 and Q2×T2×E2 are within 20% of each other.

7. The optical assembly of claim 6, wherein the first and second polymeric optical films have respective coefficients of thermal expansion A1 and A2 in a same third direction, and wherein products Q1×T1×A1 and Q2×T2×A2 are within 20% of each other, and wherein the first and third directions are within 20 degrees of each other.

8. An optical assembly comprising:
- a polymeric optical lens comprising opposing major first and second lens surfaces, at least one of the first and second lens surfaces curved; and
- first and second polymeric optical films bonded to the respective major first and second lens surfaces, the first and second polymeric optical films having respective average thicknesses T1 and T2, respective elastic stiffnesses Q1 and Q2 in a same first direction, and respective coefficients of thermal expansion A1 and A2 in a same second direction, wherein the second polymeric optical film is a reflecting polarizing film and the first polymeric optical film is a mechanical balancing film such that products Q1×T1×A1 and Q2×T2×A2 are within 20% of each other.

9. The optical assembly of claim 8, wherein for a substantially normally incident light, each of the first and second polymeric optical films has an average optical transmittance of greater than about 70% for at least a first polarization state in a visible wavelength range extending from about 420 nm to about 650 nm.

10. The optical assembly of claim 8, wherein the first and second polymeric optical films have respective thermal strains E1 and E2 in a same third direction, and wherein products Q1×T1×E1 and Q2×T2×E2 are within 20% of each other, and wherein the first and third directions are within 20 degrees of each other.

* * * * *